US006065288A

United States Patent [19]
Glomeau

[11] Patent Number: 6,065,288

[45] Date of Patent: May 23, 2000

[54] FLOW CONTROL VALVE AND HYDRAULIC SYSTEM EMPLOYING SAME

[76] Inventor: J. Robert Glomeau, 162 Farm St., Dover, Mass. 02030

[21] Appl. No.: 09/131,519

[22] Filed: Aug. 10, 1998

Related U.S. Application Data

[63] Continuation-in-part of application No. 08/835,824, Apr. 16, 1997, Pat. No. 5,791,143.

[51] Int. Cl.[7] .......... F16D 31/02

[52] U.S. Cl. .......... 60/476; 91/420; 137/106

[58] Field of Search .......... 91/420, 446; 60/473, 60/475, 476; 137/106

[56] References Cited

U.S. PATENT DOCUMENTS 4,557,180 12/1985 Glomeau .
4,625,513 12/1986 Glomeau .
4,669,494 6/1987 McBeth .......... 137/106
4,696,163 9/1987 Glomeau .
4,766,728 8/1988 Glomeau .
5,575,150 11/1996 Vieten et al. .......... 60/476
5,791,143 8/1998 Glomeau .......... 91/420

FOREIGN PATENT DOCUMENTS 23522742 5/1974 Germany .......... 91/420

*Primary Examiner*—Edward K. Look
*Assistant Examiner*—Hermes Rodriguez
*Attorney, Agent, or Firm*—Peter F. Corless; Christine C. O'Day; Dike, Bronstein, Roberts & Cushman, LLP

[57] ABSTRACT

The hydraulic control system disclosed herein employs a pair of combination poppet/spool valves to control the operation of a hydraulic cylinder driven from a bidirectional pump. Flow introduced through the source port of one valve lifts the poppet of the other valve on its way to one side of the cylinder which in turn opens a throttling port to modulate return flow from the other side of the cylinder.

8 Claims, 4 Drawing Sheets

FLOW CONTROL VALVE AND HYDRAULIC SYSTEM EMPLOYING SAME

CROSS-REFERENCE TO RELATED U.S. APPLICATION

This application is a continuation-in-part of U.S. Ser. No. 08/835,824 filed Apr. 16, 1997, now U.S. Pat. No. 5,791, 143.

BACKGROUND OF THE INVENTION

The present invention relates to hydraulic systems generally and more particularly to an improved flow control valve and a hydraulic actuator system employing the valve.

The present invention is an improvement on the valves and systems disclosed in my earlier patents, e.g. U.S. Pat. Nos. 4,696,163 and 4,766,728. Both of those patents relate to flow matching valves and bidirectional actuator systems employing the valves. The particular systems disclosed in those patents employed stepper motors to operate a bidirectional hydraulic gear pump. The pumps were necessarily finished to very close tolerances in order to have low leakage. While these prior art systems provided for very precise control of a hydraulic actuator or piston, cost was relatively high due both to the cost of the stepper motors employed and the electronic driver circuitry necessitated by the use of those motors.

Among the several objects of the present invention may be noted the provision of a hydraulic actuator system which can utilize more common a.c. and d.c. motors; the provision of such a system in which the motor is not loaded when no movement is required of the actuator; the provision of such a system in which the hydraulic operation will act as a brake on the motor; the provision of such a system which does not require exceptionally low leakage pumps to drive the system; the provision of such a system which will provide highly precise control of an actuator; the provision of such a system which will provide for bidirectional operation of an actuator; the provision of such a system which is highly reliable and which is of relatively simple and inexpensive construction. Other objects and features will be in part apparent and in part pointed out hereinafter.

SUMMARY OF THE INVENTION

In a hydraulic actuator system in accordance with the present invention, a bidirectional hydraulic actuator, e.g. a double-ended cylinder and piston, is driven from a bidirectional pump through a hydraulic system which employs a pair of combination poppet/spool valves to control the operation of the actuator. Flow introduced through the source port of one valve lifts the poppet of the other valve on its way to one side of the cylinder and this in turn opens a throttling port to modulate return flow from the other side of the cylinder.

In accordance with one aspect of the present invention, the novel control valve employed utilizes a spool valve housing having a source port opening into one end of the spool valve bore. A poppet check valve element having an operative diameter substantially equal to the bore diameter is provided in alignment with the bore. In the bore, a spool valve element is mechanically connected to the poppet valve element by a stem of a diameter smaller than the bore. The spool valve element includes an interior passage or chamber. The side of the spool valve element opposite the stem is open to the source port and movement of the spool valve element responsive to pressure at the source port is operative to open the poppet valve. The spool valve housing and the spool valve element together form both a throttle port which is opened to the interior chamber by displacement of the poppet valve element. The spool valve element and housing also form a source drain port which is opened to the source port by displacement of the spool valve element beyond that opening the throttle port. A check valve permits flow from the interior chamber to the source port.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
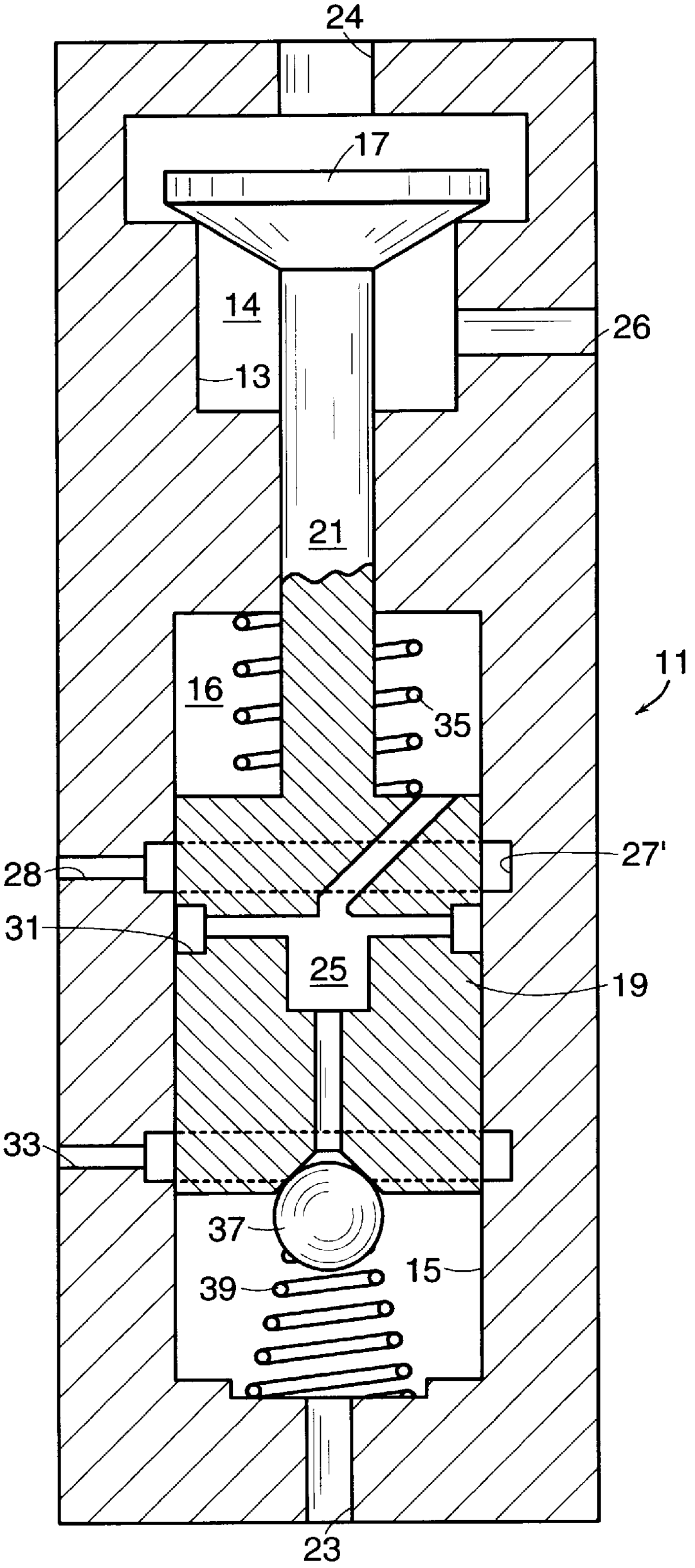
FIG. 1 is a side view, in section, of a novel flow control valve in accordance with the present invention.

Referring now to FIG. 1, there is shown a valve housing 11 providing aligned bores 13 and 15 which receive, respectively, a poppet or check valve element 17 and a spool valve element 19. The bores 13 and 15 are of equal diameter forming chambers 14 and 16. The poppet valve element 17 and the spool valve element 19 are connected by a stem 21 which is of smaller diameter than the bores 13 and 15. A source port 23 opens into the portion of the bore 15 below the spool valve element 19 and a load port 24 opens into the space above the poppet valve element 17. The space below the poppet valve element connects to a port 26 through the housing. This port is referred to herein as a load drain port, a somewhat arbitrary designation.

For purposes of illustration, the housing and valve elements are shown as solid or integral pieces. However, as will be understood by those skilled in the art, these elements must be necessarily assembled from component pieces in order to arrive at the completed construction shown. The techniques for building up such components, however, are known in the art and thus are not described in detail herein. Likewise, for ease of description, various elements are described as being "above" or "below" each other in accordance with the orientation shown in the drawing but it should be understood that the valve when in use may be in any orientation.

The housing 11 includes, around the bore 15, a pair of axially spaced annular grooves 27 and 29 which provide valving and throttling functions in connection with the spool valve element 19 as described in greater detail hereinafter. Annular groove 27 is connected to a port 28 through the housing 11. The annular groove 27 on the interior of bore 15 cooperates with an annular groove 31 on the exterior surface of the valving element 19 to provide a throttling action as described in greater detail hereinafter. When the valving elements are in their lowermost positions as shown, the hydraulic connection between grooves 27 and 31 is effectively cut off.

Annular groove 29 communicates with a port 33 through the housing 11 and cooperates with the bottom face of the valving element 19 to open a hydraulic connection between the source port 23 and the port 33 when the valving elements have moved a predetermined distance, upwardly as illustrated. The valving elements are normally biased toward this lowermost or closed position by a spring 35 in the space above the spool valve element 19 in the bore 15. Port 33 is referred to herein as a source drain port, an essentially arbitrary designation.

Within the spool valve element 19, a series of internal passageways or internal chamber 25 connects the groove 31 with a check valve constituted by a seat in the bottom surface of the valving element 19 together with a spherical valving element 37. Valving element 37 is biased into engagement with the seat by a spring 39 whose lower end rests on housing 11. Preferably, the space (16) in the bore 19 above the spool valve element 19 is also vented into the interior chamber 25.

With the ball element 37 resting in its seat, it can be seen that fluid introduced through the source port 23 will cause both the spool valve element 19 and the poppet valve element 17 to be lifted. As such lifting progresses, the poppet valve element 17 essentially immediately opens the connection between the load port 24 and the load drain port 26. Slight additional upward movement of the valve elements opens the hydraulic connections into the annular grooves 27 and 29. While it is preferred that these connections open at approximately the same position, the throttling port (groove 27) should be exposed slightly before the groove 29.

Figure 2:
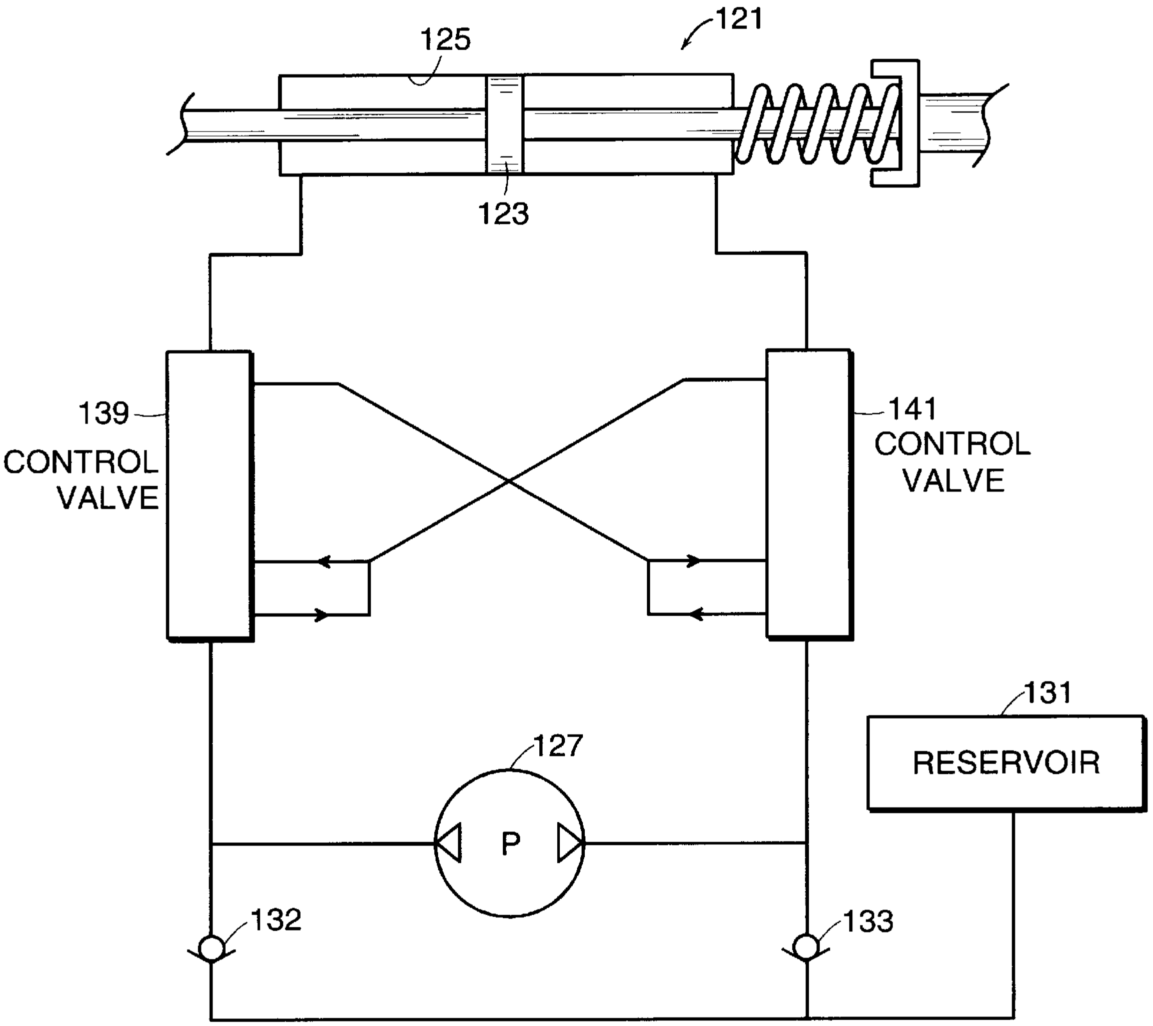
FIG. 2 is a diagrammatic illustration of a double-acting hydraulic cylinder actuator system constructed in accordance with the present invention and employing the control valve of FIG. 1.

Referring now to FIG. 2, a prime mover or actuator is indicated generally by reference character 121 and comprises piston 123 and cylinder 125. The double rod ended piston provides equal annular areas on both faces of the piston. For providing fail safe operation in certain applications, the piston is heavily biased to the right by a spring 126 so that the volume to the right of the piston can normally be considered to be the higher pressure side.

A bi-directional, positive displacement pump 127 is utilized for providing hydraulic fluid under pressure suitable for operating the actuator 121. A pressurized accumulator 131 provides a reservoir for the hydraulic fluid. This reservoir is connected through respective check valves 132 and 133 to both sides of the pump 127. Pump 127 is preferably of the positive displacement, meshing gear type and is driven in either direction by an electric motor 135 whose speed can be varied from zero to a preselected maximum by means of suitable control electronics. Movement of the piston may be tracked by a suitable transducer; e.g., a slide wire potentiometer so as to provide a suitable feedback voltage or signal for controlling the energization of the motor. The system of FIG. 2 also employs two control valves 139 and 141 of the type shown in FIG. 1.

One side of the pump 127, e.g. the left side as shown in FIG. 2, is connected to one side of the cylinder 121, (e.g. the right side) through a hydraulic circuit which includes the source/source-drain path of control valve 139 and the load drain/load path of the second flow matching valve 141. The other side of the pump 127 is symmetrically connected through a hydraulic circuit which includes the source/source-drain path of the flow matching valve 141 and the load drain/load path of the flow matching valve 139. Both flow matching valves 139 and 141 are identical in construction and size.

The load-drain port of each of the control valves 139 and 141 is also cross connected, for discharge, to the source drain port 33 of the other control valve. While the theory of operation of the overall hydraulic system is subject to differing interpretations and explanations, the following is submitted as useful in understanding its operation. In the description of operation, it is assumed that load is being applied to the piston 123 so that the right side of the cylinder is under greater pressure than the left side.

In order to drive the piston against the load, the pump 127 is driven so as to produce a flow to the left as seen in the drawing of FIG. 2. When the pressure at the outlet of the pump exceeds that on the high pressure side of the actuator 121, the valving elements in the left hand control valve 139 will be raised until the source port 23 is opened to the source drain port 23. The poppet valve 17 and the throttling valve (grooves 27 and 31) will also have been opened. Thus, during operation in this direction, the valve 139 is essentially open and has no control effect, i.e. it is "passive".

Hydraulic fluid flow proceeding from the left hand source drain port into the load drain port 26 of the right hand control valve 141 will lift its valving elements also by virtue of the force exerted on the underside of the poppet element 17. This high pressure flow will then proceed out the load port 24 and into the high pressure (right hand) side of the actuator.

Since the poppet valve portion of the left hand control valve 139 will have been opened as described previously, hydraulic fluid from the low pressure side of the actuator 121 can drain through the upper portion of control valve 139 and into the throttling port 28 of the right hand control valve 141, this port having been opened through to the groove 31 by the lifting of the valve elements by the flow past the poppet element 17. While the source drain port 33 may still be closed, the return flow can exit, past the ball check valve 37, to the source port 23 and then back to the pump on its (current) intake or suction side.

When the pump 127 is operated in the opposite direction, i.e. producing flow to the right as seen in FIG. 2, an essentially similar operation takes place but additional flow matching or throttling effects come into play. Again, the pump output pressure must reach a level at least equal to that on the high pressure side of the cylinder in order to lift the valving elements of the right hand control valve 141 against the pressure exerted on the top of the poppet element 17 since this pressure is transmitted, through the stem 21, to the spool valve element 19. In this direction of operation, the right hand valve is the "passive" one of the two. Once the source drain port 33 has been opened, flow can proceed into the load drain port 26 of the left hand control valve 139 where it will cause the poppet valve element 17 to lift somewhat and then proceed into the low pressure side of the actuator 121.

Since the poppet valve 17 on the right hand control valve 141 will have been raised, high pressure flow can proceed past the poppet valve and out the load drain port 26 of control valve 141.

However, since the flow out of the source drain port 33 from the right hand control valve 141 past the poppet valve element 17 of the left hand control valve will not be sufficient to fully open the respective source drain port 33, venting flow from the high pressure side must take place through the throttling port 28. Further, since the extent of opening between the cooperating grooves 27 and 31 in the valve 139 depends upon the amount of flow past the poppet element 17, it will be understood that a throttling operation will take place which will tend to match the venting flow from the high pressure side of the actuator 121 to the filling flow coming in to its low pressure side. It is an aspect of the present invention that the main pressure drop, i.e. down to pressure at the inlet or suction side of the pump, occurs at the spool valve opening between grooves 27 and 31. As will be understood by those skilled in the art, this pressure drop is developed without exerting force tending to displace the spool valve element along its axis, i.e. vertically as illustrated. The throttling action prevents whatever load may be present on the hydraulic actuator 121 from overrunning the motor driving pump 127. Accordingly, the operation of the system in the two directions tends to be matched. Further, when the motor driving the pump 127 is stopped, the two poppet valve elements will close in rapid succession effective freezing the piston in position. Any residual motor energy will flow back through the gear pump and back to the intake of the pump. Once stopped, the pump and its driving motor are unloaded.

Since the hydraulic circuit is entirely symmetrical, it can be seen that complementary actions are obtained if the load is applied to the piston in the opposite direction. In other words, the high pressure and low pressure sides of the cylinder are only dictated by the direction of the load vector. Conversely, the response or sensitivity of the actuator is identical in both directions regardless of the direction of the load, a highly desirable attribute as will be understood by those skilled in the servo control art.

Figure 3:
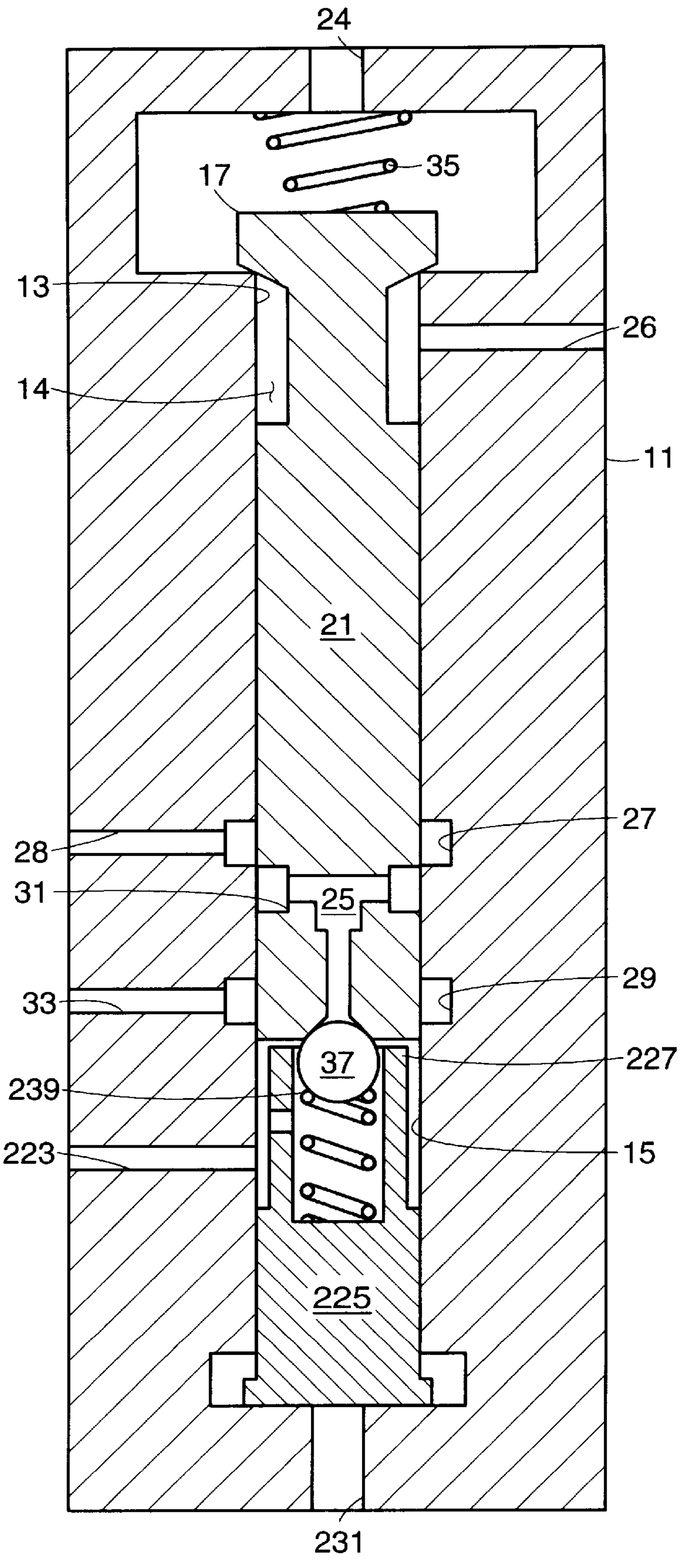
FIG. 3 is a side view, in section, of an alternate construction for a flow control valve in accordance with the present invention.

The upper portion of the control valve embodiment illustrated in FIG. 3 is essentially similar to that illustrated in FIG. 1 and corresponding reference characters have been applied to the elements which are essentially unchanged, However, the source port, designated by reference character 223, obtains access to the underside of the spool valve element 19 by opening through the side wall of the valve body 11. Further, beneath the spool valve element is a short, movable piston 225 carrying an upstanding collar 227 which is adapted to engage the bottom of the spool valve element 19. Fluid pressure access to the bottom of the piston 225 is provided through a boost port 231. The spring, designated by reference character 239 which biases the ball element 37, rests within the collar 227.

Figure 4:
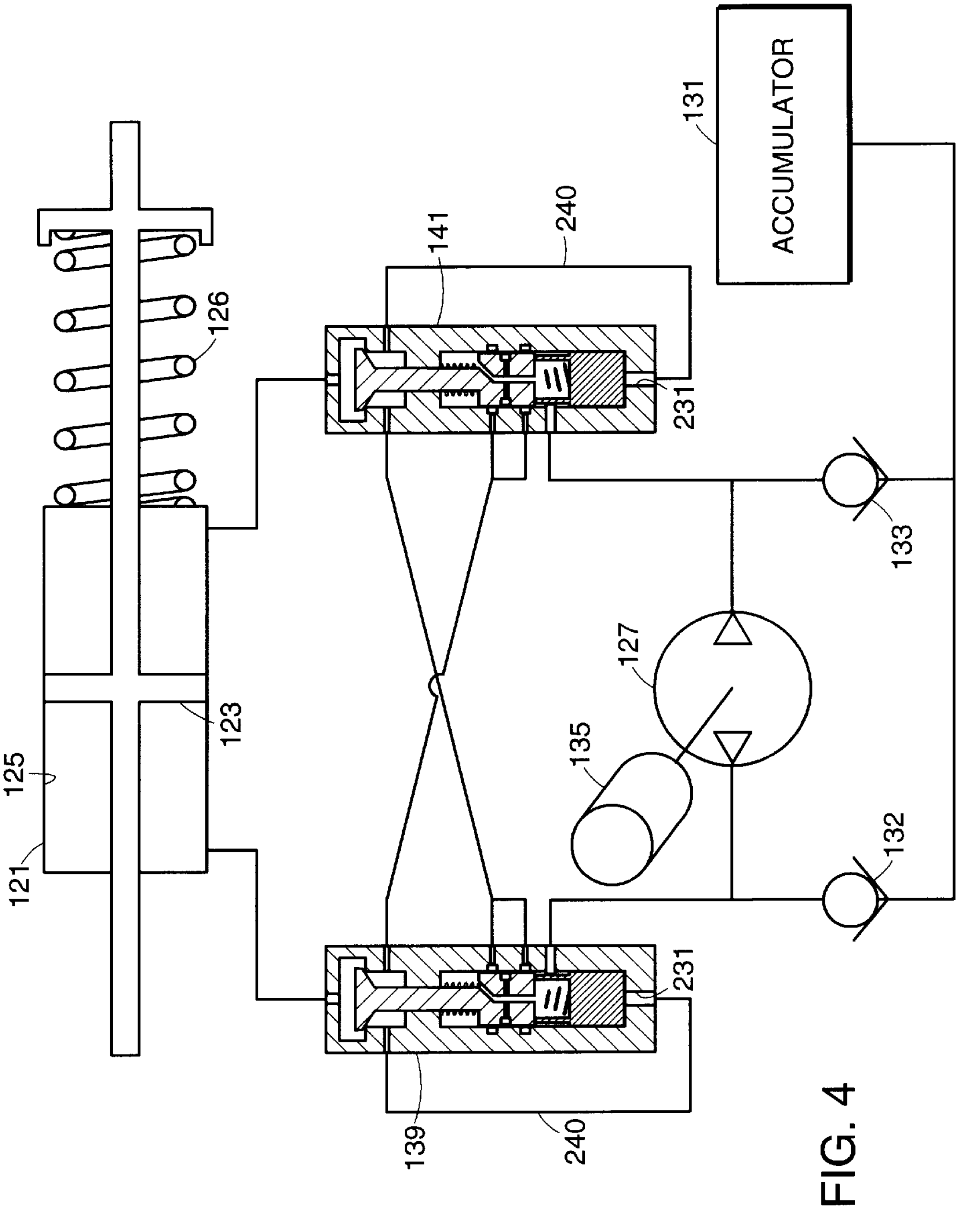
FIG. 4 is a diagrammatic illustration of a actuator system employing the control valve of FIG. 3.

The hydraulic circuit diagrammatically illustrated in FIG. 4 is likewise similar in many respects to the circuit of FIG. 2. The principal difference, however, is that the boost port 231 is connected in parallel with the load drain port 26 of the same control valve element. This connection is designated by reference character 240. The operation of the hydraulic circuit illustrated in FIG. 4 is likewise essentially similar to the hydraulic circuit of FIG. 2 during most dynamic operations. However, the connection from the load drain port 26 to the boost port serves to drive the piston 225 up against the spool valve to aid in its initial opening and thereby aids in preventing undesirable momentary locking of the hydraulic circuit when starting from rest conditions.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A control valve comprising:

a spool valve housing having a cylindrical bore;

in said housing, a source port;

in said housing, a poppet check valve element;

in said bore, a spool valve element mechanically connected to said poppet valve element, the side of said spool valve element opposite said stem being open to said source port, movement of said spool valve element responsive to pressure at said source port being operative to open said poppet valve element, said spool valve element having an interior chamber, said spool valve housing and said spool valve element forming:

a throttle port which is opened to said interior chamber by displacement of said spool valve element opening said poppet valve and a source drain port which is opened to said source port by displacement of said spool valve element opening said throttle port; and in said spool valve element, a check valve permitting flow from said interior chamber to said source port;

aligned with said spool valve element, a piston adapted to engage said spool valve element in a direction aiding opening of said poppet valve); and a port in said housing providing fluid pressure access to the side of said piston opposite said spool valve element.

2. A control valve as set forth in claim 1 wherein said poppet valve element has an operative diameter equal to that of said bore.

3. A control valve as set forth in claim 2 wherein said poppet valve element is mechanically connected to said spool valve element by a stem having a diameter smaller than that of said bore.

4. A control valve comprising:

a housing having two concentric cylindrical bores of equal diameter;

in said housing, a source port;

in said housing, a poppet check valve element at the end of one of said bores;

in the other of said bores, a spool valve element mechanically connected to said poppet valve element by a stem of diameter smaller than said bores, the side of said spool valve element opposite said stem being open to said source port, movement of said spool valve element responsive to pressure at said source port being operative to open said poppet valve element, said spool valve element having an interior chamber, said spool valve housing and said spool valve element forming:

a throttle port which is opened to said interior chamber by displacement of said spool valve element opening said poppet valve and a source drain port which is opened to said source port by displacement of said spool valve element opening said throttle port; and in said spool valve element, a check valve permitting flow from said interior chamber to said source port;

aligned with said spool valve element, a piston adapted to engage said spool valve element in a direction aiding opening of said poppet valve; and a port in said housing providing fluid pressure access to the side of said piston opposite said spool valve element.

5. A hydraulic system comprising:

a fluid reservoir;

a bidirectional pump;

a bidirectional actuator having first and second ports;

a pair of control valves each having:

a spool valve housing providing a cylindrical bore;

in said housing, a source port;

in said housing, a poppet check valve element having an operative diameter substantially equal to said bore diameter;

in said bore, a spool valve element mechanically connected to said poppet valve element by a stem of diameter smaller than said bore diameter, the side of said spool valve element opposite said stem being open to said source port, movement of said spool valve element responsive to pressure at said source port being operative to open said poppet valve element, said spool valve element having an interior chamber, said spool valve housing and said spool valve element forming a throttle port which is opened to said interior chamber by displacement of said spool valve element opening said poppet valve and a source drain port which is opened to said source port by displacement of said spool valve element opening said throttle port; and in said spool valve element, a check valve permitting flow from said interior chamber to said source port; aligned with said spool valve element, a piston adapted to engage said spool valve element in a direction aiding opening of said poppet valve; and a boost port in said housing providing fluid pressure access to the side of said piston opposite said spool valve element, means connecting said reservoir to both sides of said pump permitting flow from the reservoir toward the pump;

means connecting each side of said pump to the source port of a respective control valve;

means connecting the load port of each control valve to a respective one of said cylinder ports;

means connecting the load drain port of each control valve to the throttle port and to the source drain port of the other control valve; and means connecting the load drain port of each control valve to its boost port.

6. A control valve as set forth in claim 5 wherein said poppet valve element has an operative diameter equal to that of said bore.

7. A control valve as set forth in claim 6 wherein said poppet valve element is mechanically connected to said spool valve element by a stem having a diameter smaller than that of said bore.

8. A hydraulic system comprising:

a fluid reservoir;

a bidirectional pump;

a double acting piston and cylinder having first and second ports accessing opposite sides of the piston;

a pair of control valves each having:

a valve housing providing two concentric cylindrical bores of equal diameter;

in said housing, a source port;

in said housing, a poppet check valve element at the end of one of said bores and having an operative diameter substantially equal to said bore diameter;

in the other of said bores, a spool valve element mechanically connected to said poppet valve element by a stem of diameter smaller than said bore diameter, the side of said spool valve element opposite said stem being open to said source port, movement of said spool valve element responsive to pressure at said source port being operative to open said poppet valve element, said spool valve element having an interior chamber, said spool valve housing and said spool valve element forming a throttle port which is opened to said interior chamber by displacement of said spool valve element opening said poppet valve and a source drain port which is opened to said source port by displacement of said spool valve element opening said throttle port; and in said spool valve element, a check valve permitting flow from said interior chamber to said source port;

aligned with said spool valve element, a piston adapted to engage said spool valve element in a direction aiding opening of said poppet valve; and a boost port in said housing providing fluid pressure access to the side of said piston opposite said spool valve element;

means connecting said reservoir to both sides of said pump through respective check valves permitting flow from the reservoir toward the pump;

means connecting each side of said pump to the source port of a respective control valve;

means connecting the load port of each control valve to a respective one of said cylinder ports;

means connecting the load drain port of each control valve to the throttle port and to the source drain port of the other control valve; and means connecting the load drain port of each control valve to its boost port.

* * * * *